Feb. 18, 1930.    B. STEIN    1,747,742
APPARATUS FOR DETERMINING THE ALCOHOL IN LIQUIDS
Filed Dec. 21, 1928
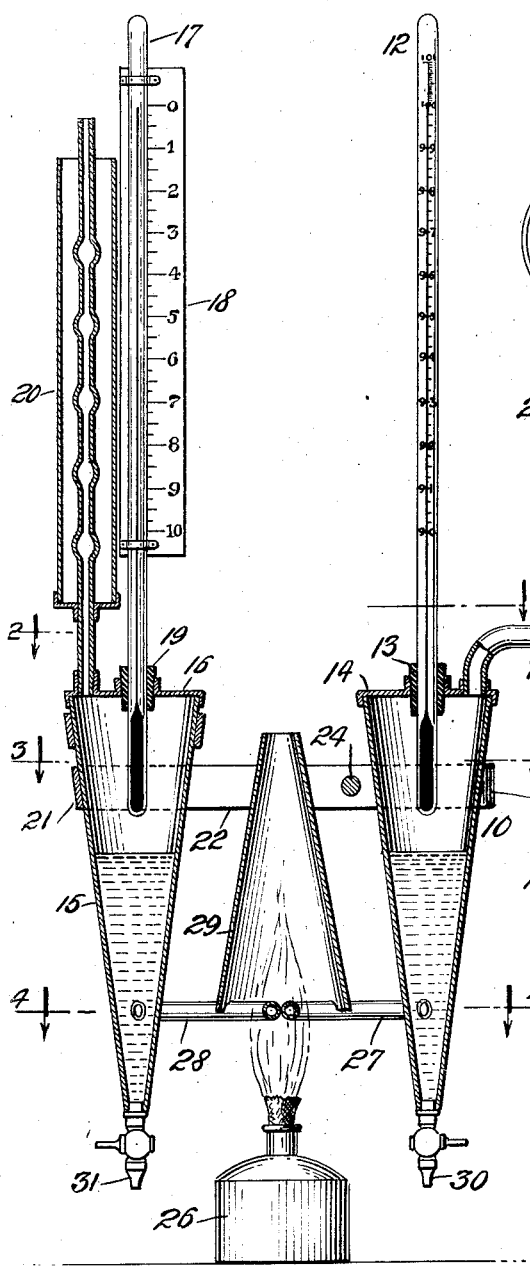
INVENTOR
BERTHOLD STEIN
BY
Geo. S. Wheelock
ATTORNEY Patented Feb. 18, 1930

1,747,742

UNITED STATES PATENT OFFICE

BERTHOLD STEIN, OF BROOKLYN, NEW YORK

APPARATUS FOR DETERMINING THE ALCOHOL IN LIQUIDS

Application filed December 21, 1928. Serial No. 327,638.

This invention relates to apparatus enabling the alcoholic content of a liquid which is to be tested to be determined and is based upon the determination of the boiling point of the liquid to be tested; the improved apparatus being of a different character from that shown, described and claimed in my Patent 1,658,950, dated February 14, 1928. In my patented apparatus a water bath is used, and I have found by experimentation that it is well adapted for determining the alcohol in a liquid where the percentage of alcohol is fairly large as in wines and liquors, but that such apparatus cannot be used to determine with accuracy a smaller percentage of alcohol, as, for example, that in "near" beer, where the percentage is in the neighborhood of one half of one per cent, more or less. With liquid in which the percentage of alcohol is as small as just stated, the boiling point thereof is so near to the boiling point of water (for example 99.5 C.) that this temperature would not be obtained in a receptacle subjected to the heat of a water bath.

For determining smaller percentages of alcohol in a liquid, the present invention embodies two separate receptacles, for the water and the liquid to be tested respectively, the two receptacles being so combined and arranged as to constitute practically one apparatus for heating, side by side, by means of heat directed between the two receptacles. In this way the contents of the two receptacles are heated simultaneously to substantially the same degree and at the same pressure of the surrounding air, the simultaneous heating at the same degree being important in determining the alcoholic content of a liquid wherein the percentage of alcohol therein is comparatively small. In the apparatus of my said patent, the receptacle for the liquid to be tested for its alcoholic content being submerged in the air or water space of the water bath, does not receive direct heat from the source of heat, so that an alcoholic content of small degree in a liquid cannot be accurately measured. In simultaneously heating the contents of the two receptacles of the present invention to the same degree in each receptacle, it is preferred that only very small portions of the water and the liquid to be tested be subjected to the action of the direct heat, so that the contents of the receptacles are more gradually and slowly heated up to the desired temperature than if the heating flame was caused to impinge directly upon the walls of the receptacles.

Broadly considered the invention resides in apparatus for determining the alcoholic content of a liquid to be tested, including the combination of a receptacle for water, a thermometer to indicate the boiling point of the water, a second receptacle for the liquid to be tested, a thermometer mounted on the second receptacle, a condenser for the vapors from the second receptacle, and means for combining and arranging the receptacles in juxtaposed relation side by side in one apparatus for heating by a single source of heat. Also the invention includes the combination of two spaced apart receptacles, respectively for holding water and a liquid to be tested, and a heating conduit extending from each receptacle into the intervening space, whereby the conduits may be heated together to simultaneously heat the contents of the receptacles.

The above being among the objects of the present invention, and the preferred novel improvements, the invention consists of certain features of construction and combinations of parts to be hereinafter described and then claimed with reference to the accompanying drawing illustrating the preferred embodiment of the invention, wherein Figure 1 is a sectional elevation showing the improved apparatus in connection with an alcohol lamp;

Fig. 2 is a top view, showing means for supporting the apparatus in suspended position;

Fig. 3 is a transverse section on the line 3—3, Fig. 1, to more particularly show means for detachably connecting the two receptacles, and Fig. 4 is a transverse section on the line 4—4, Fig. 1, to show more clearly the heating conduits for the water and the alcoholic liquid respectively.

Referring to the drawings, the receptacle 10 for the water is provided with an outlet 11 for the escape of steam from the receptacle 10. A thermometer 12 extends above the receptacle 10, such thermometer being preferably graduated into ten or more graduations indicating ten or more degrees centigrade, and in each space the successive ten graduations being divided into twenty parts as indicated in the upper part of the thermometer shown. The thermometer 12 is preferably inserted into a plug 13 of rubber or other heat insulating material which is fitted to an opening in the cover 14. Said cover may be flanged to fit tightly, yet removably, on the receptacle 10.

The receptacle or vessel 15 is for the purpose of containing the liquid whose alcoholic content is to be determined. This receptacle is provided with a cover 16 which is also tightly, yet removably, secured on the receptacle 15, such cover supporting a thermometer 17 having a sliding scale 18, for the purpose described in my aforesaid patent. The thermometer 17 is preferably received in a plug 19 of rubber or other heat insulating material which is inserted tightly in the opening of the cover 16. A reflex condenser 20 is also mounted on the cover 16 for the purpose described in my said patent.

The parts of the apparatus, 10 to 20, as specifically described just above, are either old in the prior art or in my said patent, and a more detailed description of their function is not herein necessary. The receptacles for vessels 10 and 15 may be made of copper or other suitable sheet metal or even of suitable glass, but the shape of each receptacle is preferably conical as shown in the accompanying drawings, the apices of the cones being directed downwardly. The two receptacles 10, 15 are suitably connected together, side by side, in juxtaposed relation so that they may be heated simultaneously.

The means for connecting the receptacles side by side are shown as consisting of a metal band 21 which is rigidly secured to the receptacle 15 and which has extensions 22 between the two receptacles 10, 15, the extensions 22 terminating in spring clamping members 23, the extensions being connected together by a transverse brace 24. The clamping members 23 being made of spring metal, may be forced open by pressing the receptacle 10 laterally between them, the same snapping together so as to engage with and support the receptacle 10. This enables the receptacle 10 to be readily detached from the clamping members whenever desired, and the arrangement of the receptacles may be reversed; that is the connecting means between the receptacles may be rigidly supported by the receptacle 10 and the receptacle 15 be thus removable from the clamping members 23, but the arrangement shown in the drawings is preferred as the receptacle 15 and the parts supported thereby are heavier than the receptacle 10 and its thermometer. As the receptacle 15 is here shown as constituting the support for the receptacle 10, the receptacle 15 is supported in turn in any suitable manner as by means of adjustable supporting jaws 25, shown in Fig. 2, which jaws may be supported from a standard resting upon a bench or table.

The described apparatus may be handled as a single unit, and as the receptacles 10, 15 are in juxtaposed relation, side by side, they may be heated from a single source of heat as by means of an alcohol lamp 26, the flame of which is directed into the space between the two receptacles.

Preferably the receptacles are provided with special means for slowly heating their contents. To this end a loop-like conduit or metal pipe 27 is located at the lower end of the receptacle 10 at a slight distance above its apex, the opposite ends of the conduit being in communication with the interior of the receptacle 10. A similar loop-like conduit 28 is provided at the lower end of the receptacle 15. These heating conduits in practice preferably have passages of about one fifth of an inch in diameter, and when the parts of the apparatus are in using position, they extend into the space between the receptacles, and are preferably in abutting relation, so that the source of heat will be directed towards the midlength of the conduits, for the purpose of gradually and slowly heating the contents of the receptacles as such contents flow through them. It is obvious that a gradual flow of the water through its conduit and of the alcoholic liquid through its conduit is established, because the very hot contents of each conduit is displaced by cooler water or liquid from within the receptacles.

The heating flame from the lamp is preferably directed also into a flue 29 which may be supported upon the conduits 27, 28 and which extends upwardly to a point adjacent the upper ends of the receptacles, and the length of this flue may be extended if it be found that the thermometers are directly affected by the heat rising from the flue. In fact the flue may be heat insulated, if desired, for obtaining more desirable results. This flue 29 may be removed whenever desired and it simply rests upon the conduits 27, 28.

It is preferred that pet cocks 30, 31 be located at the lower ends of the receptacles or vessels 10, 15 for the purpose of draining them whenever required.

From the drawings and description of the preferred embodiment of the present invention it is clear that the apparatus is especially desirable where it is aimed to obtain the alcoholic content of a liquid in which the said content is but a small percentage of the body of the liquid; and it is obvious that the apparatus illustrated and described can be modified, changed or altered in various ways without departing from the spirit of the invention as defined in the scope of the appended claims.

What I claim as new, is:

1. In apparatus for determining the alcoholic content of a liquid to be tested, the combination of a conical receptacle for water, a thermometer to indicate the boiling point of the water, a second conical receptacle for the liquid to be tested, a thermometer mounted on the second receptacle, a condenser for the vapors from the second receptacle, the receptacles being located in juxtaposed relation side by side in one apparatus, the apices of the cones being downward for enabling heating by a single source of heat directed between the apices.

2. In apparatus for determining the alcoholic content of a liquid to be tested, the combination of a receptacle for water, a thermometer to indicate the boiling point of the water, a second receptacle for the liquid to be tested, a thermometer mounted on the second receptacle, a condenser for the vapors from the second receptacle, the receptacles being located in spaced relation side by side, and heating conduits communicating with the lower ends of the respective receptacles and directed towards each other into the space between the receptacles.

3. In apparatus for determining the alcoholic content of a liquid to be tested, the combination of a receptacle for water, a thermometer to indicate the boiling point of the water, a second receptacle for the liquid to be tested, a thermometer mounted on the second receptacle, a condenser for the vapors from the second receptacle, the receptacles being located in spaced relation side by side and heating conduits in the form of loops communicating with opposite sides of the lower ends of the respective receptacles and directed towards each other into the space between the receptacles.

4. In apparatus for determining the alcoholic content of a liquid to be tested, the combination of a conical receptacle for water, a thermometer to indicate the boiling point of the water, a second conical receptacle for the liquid to be tested, a thermometer mounted on the second receptacle, a condenser for the vapors from the second receptacle, the receptacles being located in spaced relation side by side with their apices downward, and heating conduits communicating directly with the apicial portions of the receptacles and directed towards each other into the space between the receptacles.

5. In apparatus for determining the alcoholic content of a liquid to be tested, the combination of a receptacle for water, a thermometer to indicate the boiling point of the water, a second receptacle for the liquid to be tested, a thermometer mounted on the second receptacle, a condenser for the vapors from the second receptacle, the receptacles being located in juxtaposed relation side by side in one apparatus for heating by a single source of heat, and a flue extending upwardly between the receptacles.

6. In apparatus for determining the alcoholic content of a liquid to be tested, the combination of a receptacle for water, a thermometer to indicate the boiling point of the water, a second receptacle for the liquid to be tested, a thermometer mounted on the second receptacle, a condenser for the vapors from the second receptacle, the receptacles being located in spaced relation side by side, and heating conduits communicating with the lower ends of the respective receptacles and directed towards each other into the space between the receptacles, the conduits being in substantially abutting relation for being heated by one source of heat.

BERTHOLD STEIN.